Figure 1:
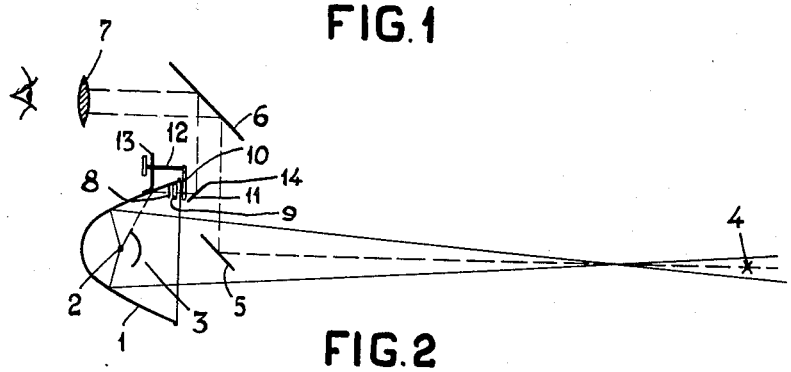

March 22, 1960  J. J. VOS  2,929,295
NIGHT VISIBILITY METER
Filed May 15, 1958

INVENTOR.
Johannes Jacobus Vos
BY
Hammond & Littell
ATTORNEYS

2,929,295
NIGHT VISIBILITY METER

Johannes Jacobus Vos, Soesterberg, Netherlands, assignor to Nederlandse Organisatie voor Toegepast-Natuurwetenschappelijk Onderzoek ten behoeve van de Rijksverdediging, The Hague, Netherlands Application May 15, 1958, Serial No. 735,500

Claims priority, application Netherlands May 22, 1957

2 Claims. (Cl. 88—23)

Various methods are known for measuring the visibility at night (whereby, as is usual, the values obtained are converted into daylight values). According to many of these methods the illumination caused by a very distant lamp is compared visually or photoelectrically with the illumination caused by a lamp which is positioned nearby.

With some night visibility meters the same lamp is used for the two tracks of light. One track of light is allowed to pass over a certain length through the atmosphere via mirrors, while the other track of light is led direct from the lamp to the photometer via a brightness reducer.

However, the latter method of measuring has some drawbacks. Since high accuracy and great stability are required the technical demands to be made upon this apparatus are very high.

Furthermore the maintenance, i.e. keeping clean and dry the mirror which is situated at a substantial distance, is cumbersome and timeconsuming. Furthermore the intensity of light of the combination lamp-mirror-photometer has to be particularly high, since otherwise the field of vision is not sufficiently bright.

All of these night visibility meters have the disadvantage that the visibility range is limited, the upper limit being too low since in that region the extinction becomes invisibly small, the lower limit being too high since in that region the remaining illumination is below the observation limit.

The object of the invention is to provide a low cost visibility meter with a simple construction and a great visibility range which yet gives reproducible measuring results.

Another object is to provide a simple visibility meter which does not require the use of a mirror which is positioned on a substantial distance of the observer.

Other objects of the invention will be clear from the description below.

In my invention the brightness originating from light of a light beam which has passed through the atmosphere over a certain distance, is compared photometrically with the brightness of adjustably reduced, substantially direct light originating from the same light-source.

The invention consists in principle herein, that the light scattered back by the haze in the atmosphere in the direction of the light source is used as photometrical source of comparison.

To this end the device according to the invention comprises preferably a substantially parabolic reflector with a light source positioned substantially in the focal point of the reflector and a plane mirror positioned just before the reflector in the centre of the light beam for the reflection to the observer of the light scattered back in the direction of the light source and as comparison object a frosted screen such as a plate of opal glass which is illuminated for a part by the reflector via an adjustable reducer and for a separate part by the light reflected by the said mirror.

Figure 2:
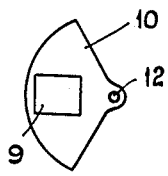

The invention is further illustrated by way of example in the Figures 1 and 2 which show a suitable embodiment of the meter.

The apparatus comprises a projector containing a light source 2, e.g. an inncandescent bulb (shown schematically) with the inside mirror 3, mounted in a reflector 1.

Just before the projector, in the centre of the beam, a mirror 5 is positioned in such a way that an observer, positioned outside the beam can observe the light which has been scattered backwards (i.e. from a point 4 such as a haze drop) via an ocular device, comprising mirror 6 and lens 7, together with the screen 11 illuminated by the reflector via the adjustable reducer 9, 10. The reducer consists of a fixed plate of light-polarizing material, sold under the trade mark Polaroid, such as the "Polaroid" plate 9 and a "Polaroid" plate 10 which is pivotably mounted in the support 13 and which may have the shape of a quarter of a circle.

With a view to obtaining a homogeneous diffuse illumination at the screen 11, it may be frosted or preferably a frosted glass plate 8 may be mounted, e.g. between the projector and the screen 11.

The mirror 6 is not essential; the plates 5 and 11 might also be observed from the direction perpendicular to the beam.

The observer sees in the mirror 6 the reflected images of screen 11 and mirror 5 with a separation line 14 originating from the border of screen 11.

In turning the polarizer 10 by means of knob 15 the brightnesses on both sides of the separation line 14 are equalized. A scale division is made on the support 13 and can be calibrated direct in visibility values.

In a suitable embodiment use was made of a lamp with reflector, the illumination intensity of which may be indicated schematically at 6000 lux for the first 115 cm. and subsequently $$\frac{8000}{l^2}$$

lux ($l$=distance from lamp in metres).

In the relative field of art the following formula is known: $Z=3.9/\beta$, in which $Z$ is the visibility distance and $\beta$ is the extinction coefficient of the atmosphere.

In case of the above-mentioned combination the brightness of the light scattered back is $700\beta$ which according to the above-mentioned formula equals $$\frac{2730}{Z}$$

cd/sq.m. ($Z$ in metres). If the visibility is 3 km., the brightness of the light scattered back is still approx. 1 cd/sq.m., thus high enough for being observed with a light-adapted eye.

With the night visibility meter according to the invention practically no limit exists for the measuring range, since the brightness to be measured increases with decreasing visibility at the lower visibility range and with very good visibility ($Z\approx20$ km.) too, easily measurable brightnesses are produced. The apparatus described can rapidly be adjusted and read. Since no additional arrangement at a substantial distance is necessary, the apparatus is also suitable for use at sea, where the distance available (ship's distance) is generally too small to perform visibility measurements according to the extinction principle.

It will be clear that my night visibility meter can be combined with a photoelectrical comparator and with registration means, in which case the fact that the light source need not be replaced if the visibility changes into another range is an additional advantage as compared with the prior art devices provided with the said auxiliary devices. It will be clear that numerous variations may be designed and carried out without departing from the essential features which are defined in the following claims.

I claim:
1. A unitary night visibility meter comprising (1) a housing containing a source of light, reflecting means for transmitting said light in a light beam in the direction in which visibility is desired to be measured, and means for adjustably reducng the brightness of a small portion of said light beam originating directly from said light source, and (2) a photometric means attached to said housing for comparing the brightness of light which is scattered backwards by the atmosphere toward said meter with the brightness of said small portion of said light beam originating directly from said light source.

2. A unitary night visibility meter comprising (1) a housing containing a substantially parabolical reflector, a source of light positioned in the focal point of said reflector, said reflector transmitting said light in a light beam in the direction in which visibility is desired to be measured, a mirror within said housing positioned in the center of said beam of light for reflecting the light scattered backwards by the atmosphere, a means for adjustably reducing the brightness of a small portion of said light beam originating directly from said light source, and (2) a photometric means attached to said housing for comparing the brightness of light which is scattered backwards by the atmosphere toward said meter with the brightness of said portion of said light beam originating directly from said light source and as a plane of comparison a frosted screen which is illuminated by the said small portion of said light beam originating directly from said light source via an adjustable reducer and is positioned just beside the path of the said backward scattered light reflected by said mirror so that the luminance of said source of light can be compared with the luminance which can be observed in said mirror.

References Cited in the file of this patent

UNITED STATES PATENTS 2,661,650 Duntley _____ Dec. 8, 1953

FOREIGN PATENTS 467,082 Italy _____ Nov. 26, 1951

UNITED STATES PATENT OFFICE
CERTIFICATE OF CORRECTION

Patent No. 2,929,295 March 22, 1960

Johannes Jacobus Vos

It is hereby certified that error appears in the above numbered patent requiring correction and that the said Letters Patent should read as corrected below.

Column 4, line 7, for "said portion" read -- said small portion --.

Signed and sealed this 26th day of December 1961.

(SEAL)
Attest:

ERNEST W. SWIDER
Attesting Officer

DAVID L. LADD
Commissioner of Patents

USCOMM-DC